United States Patent
Kang et al.

(10) Patent No.: US 7,542,618 B2
(45) Date of Patent: Jun. 2, 2009

(54) APPARATUS AND METHOD FOR DATA PROCESSING BY USING A PLURALITY OF DATA PROCESSING APPARATUSES AND RECORDING MEDIUM STORING PROGRAM FOR EXECUTING THE METHOD

(75) Inventors: Hyun Kang, Suwon-si (KR); Sung-hee Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 598 days.

(21) Appl. No.: 11/272,714

(22) Filed: Nov. 15, 2005

(65) Prior Publication Data

US 2006/0177144 A1 Aug. 10, 2006

(30) Foreign Application Priority Data

Feb. 7, 2005 (KR) .................. 10-2005-0011444

(51) Int. Cl.
*G06K 9/40* (2006.01)
(52) U.S. Cl. ...................... 382/254; 382/260
(58) Field of Classification Search ............. 382/254, 382/274, 275, 260, 305, 312; 358/1.14, 1.9, 358/515; 345/531
See application file for complete search history.

(56) References Cited

U.S. PATENT DOCUMENTS

| | | | | |
|---|---|---|---|---|
| 4,733,349 A | * | 3/1988 | Sumiyoshi et al. ......... | 711/159 |
| 5,317,700 A | * | 5/1994 | Hammitt et al. ............. | 712/240 |
| 5,490,516 A | | 2/1996 | Hutson | |
| 6,750,890 B1 | * | 6/2004 | Sugimoto ................... | 715/838 |
| 7,280,238 B2 | * | 10/2007 | Akiyoshi .................... | 358/1.14 |
| 7,398,282 B2 | * | 7/2008 | Amaku et al. ............... | 707/200 |
| 2005/0020246 A1 | * | 1/2005 | Kang ........................ | 455/412.1 |
| 2005/0052463 A1 | * | 3/2005 | Hung ......................... | 345/531 |
| 2005/0144066 A1 | * | 6/2005 | Cope et al. .................... | 705/14 |

FOREIGN PATENT DOCUMENTS

| | | |
|---|---|---|
| CN | 1549603 A | 11/2004 |
| EP | 1392047 A2 | 2/2004 |
| JP | 10-044484 A | 2/1998 |
| JP | 2000-354123 A | 12/2000 |
| JP | 2001-143055 A | 5/2001 |
| JP | 2004-193702 A | 7/2004 |
| KR | 10-2004-0011084 A | 2/2004 |

* cited by examiner

*Primary Examiner*—Kanji Patel
(74) *Attorney, Agent, or Firm*—Sughrue Mion, PLLC

(57) ABSTRACT

A data processing method using a plurality of data processing apparatuses is provided. In the method, a current data processing apparatus adaptively processes data using data processing history information of a previous data processing apparatus. The method includes receiving data from one of the data processing apparatuses, receiving data processing history information regarding processing of the data by the data processing apparatus, and processing the data based on the data processing history information.

45 Claims, 6 Drawing Sheets

APPARATUS AND METHOD FOR DATA PROCESSING BY USING A PLURALITY OF DATA PROCESSING APPARATUSES AND RECORDING MEDIUM STORING PROGRAM FOR EXECUTING THE METHOD

BACKGROUND OF THE INVENTION

This application claims priority from Korean Patent Application No. 10-2005-0011444, filed on Feb. 7, 2005, in the Korean Intellectual Property Office, the disclosure of which is incorporated herein in its entirety by reference.

1. Field of the Invention

Apparatuses and methods consistent with the present invention relate to a data processing using a plurality of data processing apparatuses, and more particularly, to realizing optimum data processing by sharing data processing history information of at least one data processing apparatus.

2. Description of the Related Art

FIG. 1 is a block diagram for explaining a conventional image processing method for enhancing image quality between image processing apparatuses. Referring to FIG. 1, a host device 110, for example, a digital versatile disc player (DVDP), includes an image quality enhancing unit 112, a control unit 114, and an image generating unit 116. A display device 120, e.g., a television (TV) set, includes an image-enhancing unit 122, a control unit 124, and an image output unit 126. The host device 110 and the display device 120 are connected to each other by an image interface 300.

Controlled by the control unit 114, the image quality enhancing unit 112 enhances image quality of an image signal generated by the image generating unit 116 of the host device 110 and outputs the image signal with enhanced image quality. The image signal output from the host device 110 is input to the display device 120 via the image interface 300. Once the image signal is input to the display device 120, the control unit 124 controls the image signal. Controlled by the control unit 124, the image quality enhancing unit 122 enhances the image quality of the image signal and outputs the image signal with enhanced image quality to the image output unit 126.

As described above, conventional image devices do not share information regarding the processing of image quality of an image signal input to or output from the image devices. Therefore, even though the image quality of the image signal was already enhanced by the image-enhancing unit 112 of the host device 110, the image signal is processed again by the image-enhancing unit 122 of the display device 120 to enhance image quality. Consequently, the process of enhancing image quality is redundantly performed or an optimized enhancement of image quality is not effectively performed to a desired level.

For example, after the image-enhancing unit 112 of the host device 110 low-pass filters input data to eliminate noise contained in the input data, if the image-enhancing unit 122 of the display device 120 low-pass filters the input data again, the input data may be distorted as well as the noise of the input data is eliminated.

SUMMARY OF THE INVENTION

The present invention provides a data processing method in which data processing history information of at least one data processing apparatus is shared with a plurality of data processing apparatuses such that the data processing apparatuses can optimally process input data.

According to an aspect of the present invention, there is provided a data processing method using a plurality of data processing apparatuses. The method includes: receiving data from one of the data processing apparatuses; receiving data processing history information regarding processing of the data by the data processing apparatus; and processing the data based on the data processing history information.

The data may be image data, and the data processing apparatus may be an image quality enhancing unit enhancing image quality of the image data.

The data may be audio data, and the data processing apparatus may be an audio processing unit enhancing audio quality of the audio data.

The method may further include updating the data processing history information such that information regarding data processing by a current data processing apparatus is included in the data processing history information.

According to another aspect of the present invention, there is provided an apparatus for processing input data in association with a plurality of data processing apparatuses. The apparatus includes: an input unit receiving data from one of the data processing apparatuses and receiving data processing history information regarding processing of the data by the data processing apparatus; and a data processing unit processing the data based on the data processing history information.

According to another aspect of the present invention, there is provided a data processing method using a plurality of data processing apparatuses. The method includes: performing a predetermined data processing operation on input data; generating data processing history information regarding processing of the input data; and transmitting the processed input data and the generated data processing history information to one of the data processing apparatuses.

According to another aspect of the present invention, there is provided an apparatus for processing input data in association with a plurality of data processing apparatuses. The apparatus includes: a data processing unit performing a predetermined data processing operation on input data; a data processing history information generating unit generating data processing history information regarding processing of the input data; and a transmitting unit transmitting the processed input data and the generated data processing history information to one of the data processing apparatuses.

According to another aspect of the present invention, there is provided a computer-readable recording medium storing a program for executing a data processing method using a plurality of data processing apparatuses, the method including: receiving data from one of the data processing apparatuses; receiving data processing history information regarding processing of the data by the data processing apparatus; and processing the data based on the data processing history information.

According to another aspect of the present invention, there is provided a computer-readable recording medium storing a program for executing a data processing method using a plurality of data processing apparatuses, the method including: performing a predetermined data processing operation on input data; generating data processing history information regarding processing of the input data; and transmitting the processed input data and the generated data processing history information to one of the data processing apparatuses.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 1:
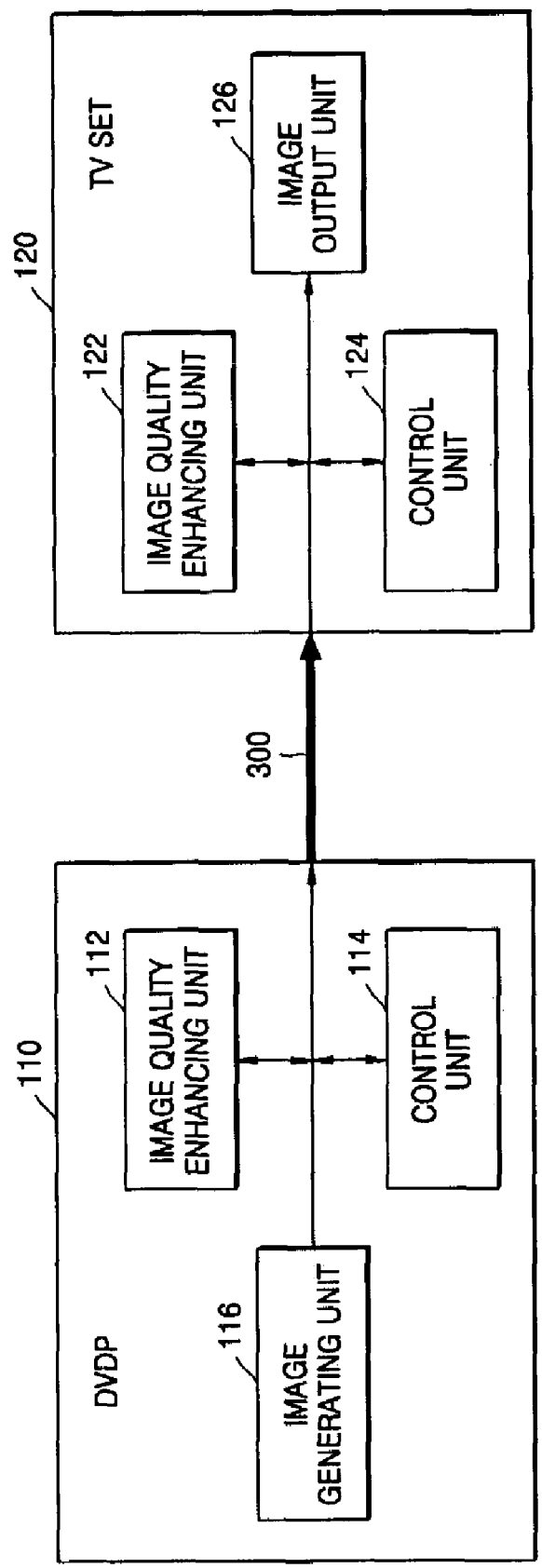
FIG. 1 is a block diagram of conventional image processing apparatuses for enhancing image quality.
Figure 2:
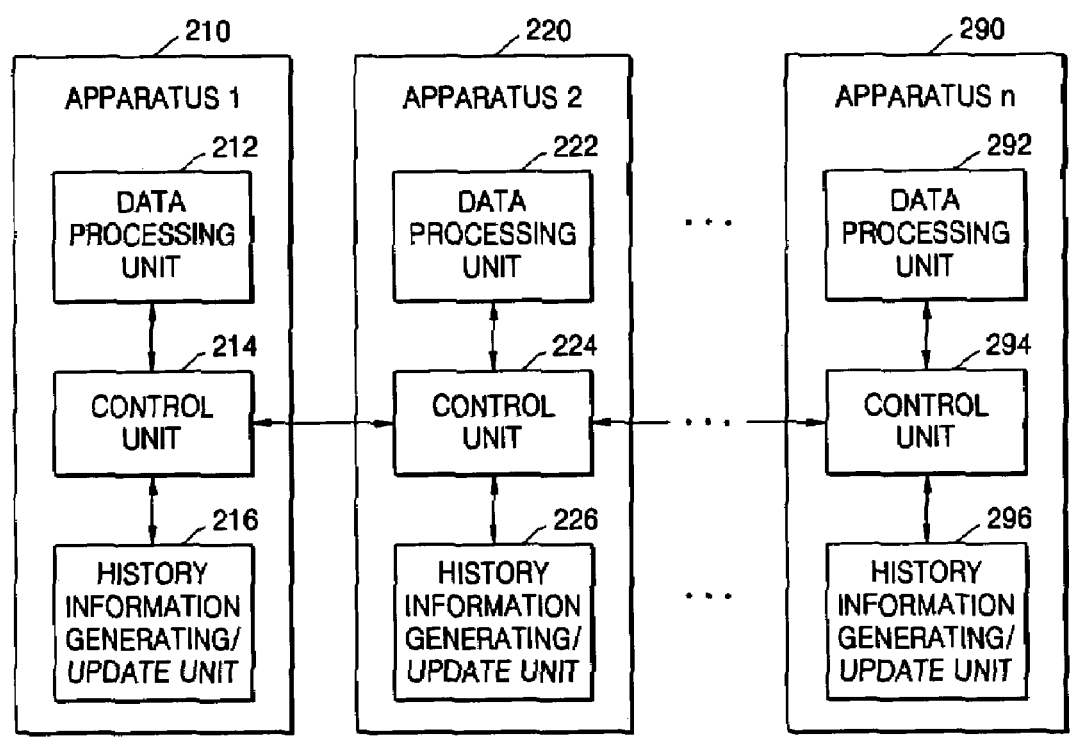
FIG. 2 is a block diagram of a plurality of data processing apparatuses for illustrating a method of processing data using the processing apparatuses according to an exemplary embodiment of the present invention.

FIG. 2 is a block diagram of first through $n^{th}$ data processing apparatuses 210, 220, . . . 290 for illustrating a method of processing data using the first through $n^{th}$ data processing apparatuses 210, 220, . . . 290 according to an exemplary embodiment of the present invention. Referring to FIG. 2, the first through $n^{th}$ data processing apparatuses 210, 220, . . . 290 include n data processing units 212, 222, . . . 292, n control units 214, 224, . . . 294, n history information generating/updating units 216, 226, . . . 296, and uni-directional interface units for data transmission among the first through $n^{th}$ data processing apparatuses 210, 220, . . . 290.

The uni-directional interface units used in the present invention include a physical connection unit, for example, a serial communication channel, and a logical connection unit, for example, a watermark that hides information in data itself or a method of sending information to an inactive area of a video signal.

Alternatively, the interface units used in the present invention may be bi-directional interface units.

Figure 3:
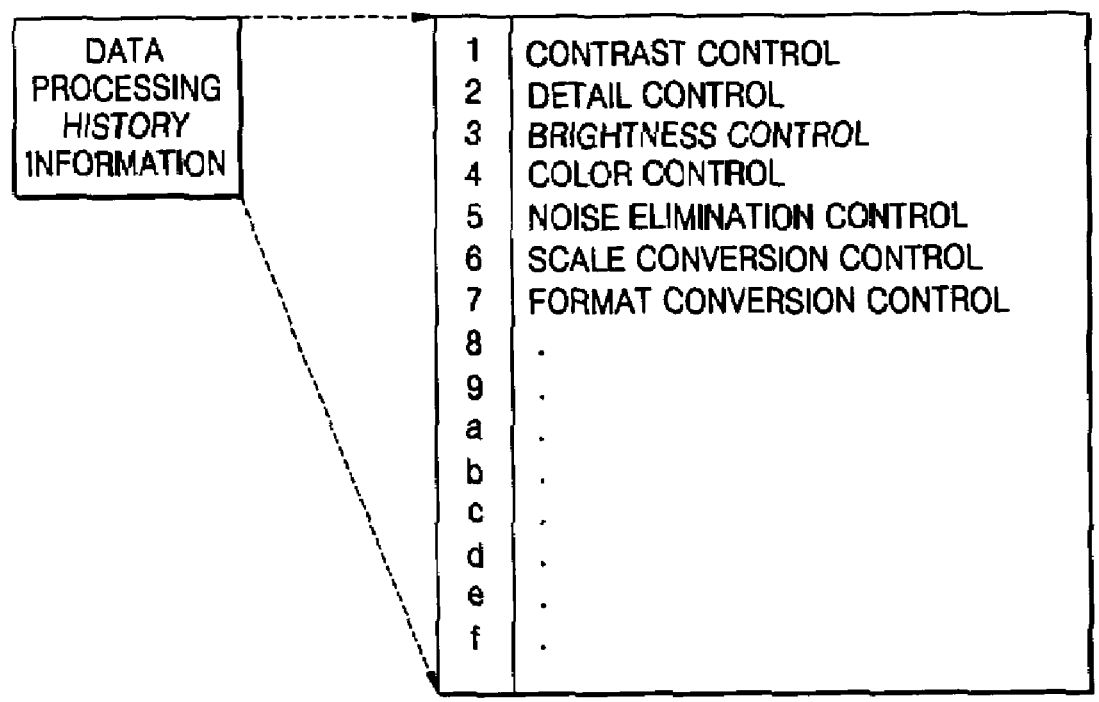
FIG. 3 illustrates data processing history information according to an exemplary embodiment of the present invention.

FIG. 3 illustrates data processing history information generated by the history information generating/updating units 216, 226, . . . 296 respectively included in the first through $n^{th}$ data processing apparatuses 210, 220, . . . 290 according to an exemplary embodiment of the present invention. The data processing history information shown in FIG. 3 includes information regarding data processing by a data processing unit. For example, the data processing history information includes information regarding contrast control, detail control, brightness control, color control, noise elimination control, scale conversion control, and format conversion control. The data history information also includes information regarding algorithms used to process signals for image quality enhancement items and information regarding parameters set in an algorithm.

The data processing history information shown in FIG. 3 is an exemplary embodiment of the present invention. Data processing history information according to various exemplary embodiments of the present invention, which includes other unmentioned items for image quality enhancement, may also be used. For example, when data was low-pass filtered to eliminate noise, attribute information indicating a level of the low-pass filtering may also be included in the data processing history information. In other words, if a range of filtering level is 0 through 1, information indicating a filtering level of 0.8 may be further included in the data processing history information.

Further, when input data includes voice data or other types of data, the data processing history information includes an algorithm used to process such data, for example, information regarding parameters set in a graceful degradation technology for preventing degradation of voice quality in the case of voice data. Alternatively, the data processing history information may include information for synchronizing image data with voice data.

Information regarding data processing by each of the data processing apparatuses 210, 220, . . . 290 is stored in each lookup table. After a current data processing apparatus finishes processing input data, information regarding the data processing by the current data processing apparatus is input to a next data processing apparatus, together with the processed input data or as separate additional information.

For example, after the data processing unit 212 of the second data processing apparatus 210 low-pass filters input data, the history information generating/updating unit 216 generates data processing history information, which includes information indicating that the input data was low-pass filtered. The control unit 214 transmits the data processing history information generated by the history information generating/updating unit 216 to the second data processing apparatus 220, together with the low-pass filtered input data. Alternatively, the data processing history information may include attribute information indicating a filtering level of 0.8.

In the present exemplary embodiment, input data processed by a current data processing apparatus is transmitted to a next data processing apparatus together with data processing history information. However, the data processing history information may also be transmitted to a next data processing apparatus through a separate channel.

The second data processing apparatus 220 determines a data processing condition for the received input data with reference to the data processing history information received from the first data processing apparatus 210. For example, if a data processing algorithm that can be performed by the data processing unit 222 includes an algorithm for low-pass filtering, the data processing unit 222 does not perform the low-pass filtering algorithm according to the received data processing history information and only performs other data processing algorithms, for example, an algorithm for contrast enhancement.

The history information generating/updating unit 226 updates the received data processing history information and includes information regarding additional data processing, i.e., contrast enhancement, in the data processing history information. The control unit 224 transmits the input data with enhanced contrast and the updated data processing history information to a next data processing apparatus, i.e., the third data processing apparatus.

In the present exemplary embodiment, the data processing unit 222 does not low-pass filter the input data. However, if the input data was low-pass filtered by the data processing unit 212 at a filtering level of, for example, 0.8, the data processing unit 222 may low-pass filter the input data at a filtering level of 0.1, with reference to attribute information included in the data processing history information.

The $n^{th}$ data processing apparatus 290 determines a data processing condition for received input data with reference to data processing history information transmitted from a previous data processing apparatus. For example, if a data processing algorithm that can be performed by the data processing unit 292 includes the algorithms for low-pass filtering and contrast enhancement and the received data processing history information indicates that such algorithms were performed, the data processing unit 292 does not perform the algorithms for low-pass filtering and contrast enhancement and only performs other data processing algorithms.

As described above, in the data processing method according to the present invention, data processing history information of a previous data processing apparatus is shared with a next data processing apparatus. Therefore, inefficiency in data processing and signal distortion due to redundant data processing can be prevented.

Since the data processing history information shown in FIG. 3 is coded, the coded data is decoded by one of the control units 214, 224, ... 294 included in the first through $n^{th}$ data processing apparatuses 210, 220, ... 290.

Figure 4A:
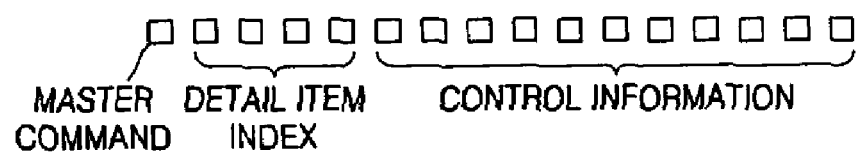
FIGS. 4A and 4B illustrate data configuration used in the lookup table of FIG. 3 according to an exemplary embodiment of the present invention.

FIG. 4A illustrates data configuration used in the data processing history information of FIG. 3 according to an exemplary embodiment of the present invention. In the present exemplary embodiment, data is composed of 16 bits, and a first bit indicates whether a data processing algorithm corresponding to a detail item was performed on input data. For example, if a value of the first bit is "0," it indicates that a data processing algorithm corresponding to a detail item was not performed. If the value of the first bit is "1," it indicates that the data processing algorithm corresponding to the detail item was performed.

Second through fifth bits indicate detail item indexes. For example, if values of the second through fifth bits are "0000," it indicates that an item is for contrast enhancement. If the values of the second through fifth bits are "0001," it indicates that the item is for detail enhancement. If the values of the second through fifth bits are "0010," it indicates that the item is for brightness enhancement, if "0011," color enhancement, if "0101," noise elimination, if "0110," scale conversion, and if "0111," format conversion.

Sixth through sixteenth bits indicate control information of an item. For example, if the value of the first bit is "0" and the values of the second through fifth bits are "0000," the second through sixteenth bits indicate an intensity level, at which the contrast of input data was adjusted, in a predetermined range (e.g., 1 through 100) of intensity level for contrast adjustment.

Figure 4B:
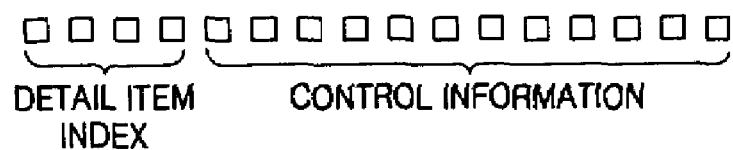

FIG. 4B illustrates data configuration used in the data processing history information of FIG. 3 according to another exemplary embodiment of the present invention. In the present exemplary embodiment, data is composed of 16 bits, and first through fourth bits indicate detail item indexes. The functions of the first through fourth bits are identical to those of the second through fifth bits of FIG. 4A, and thus their detailed descriptions will be omitted. In addition, fifth through sixteenth bits indicate control information of a detail item. The functions of the fifth through sixteenth bits are identical to those of the sixth through sixteenth bits of FIG. 4A, and thus their detailed descriptions will be omitted.

Figure 5:
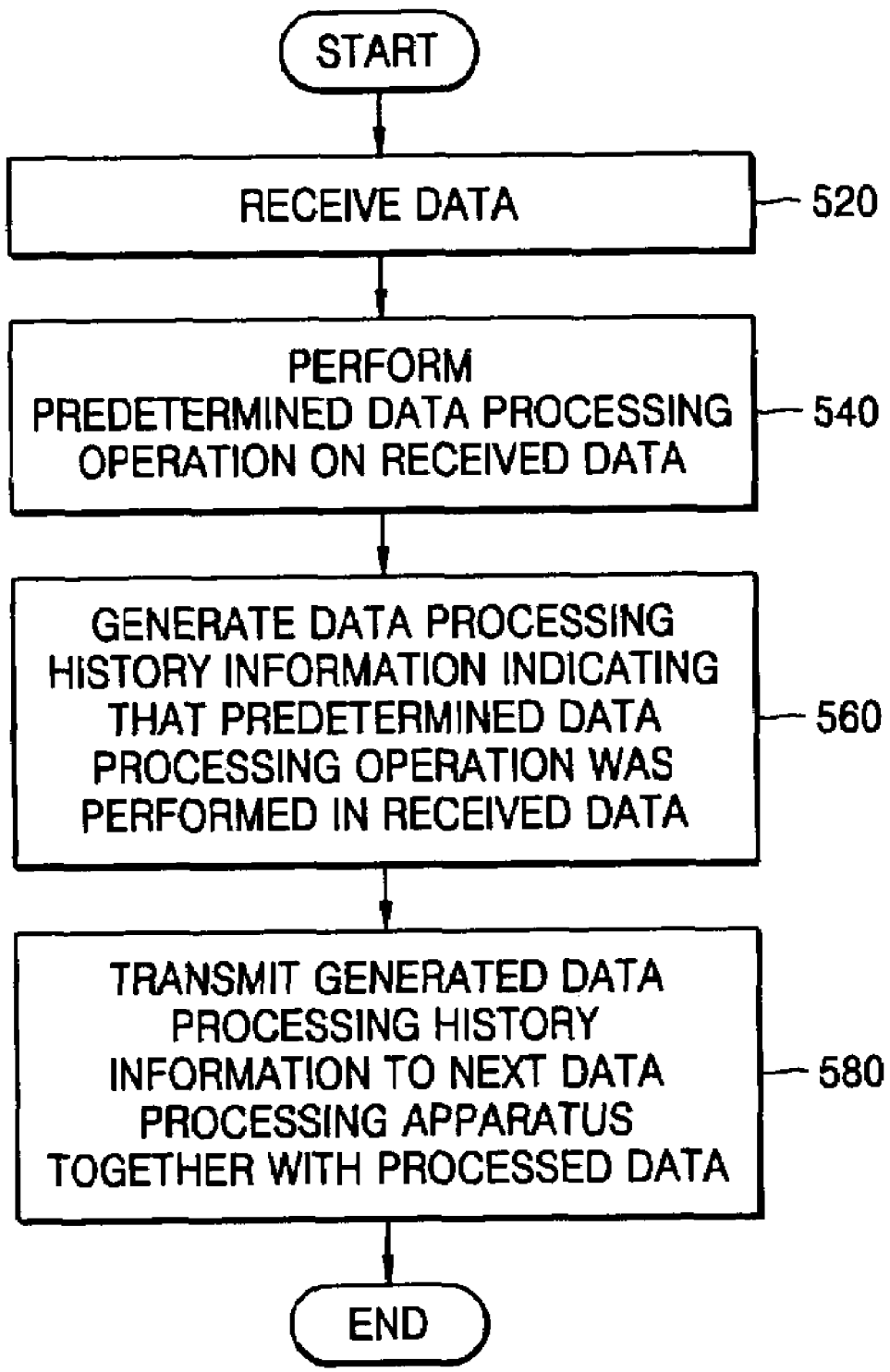
FIG. 5 is a flowchart illustrating a data processing method using a data processing apparatus according to an exemplary embodiment of the present invention.

FIG. 5 is a flowchart illustrating a data processing method using the first data processing apparatus 210 of FIG. 2 according to an exemplary embodiment of the present invention. The method will now be described with reference to FIGS. 2 through 4.

In operation 520, data is received from an external device via a network, a storage medium, or a broadcasting receiver connected to the external device. The data may be video data, audio data or multimedia data, for example.

In operation 540, a predetermined data processing algorithm is performed on the data. For example, the data is low-pass filtered to eliminate noise.

In operation 560, data processing history information indicating that the predetermined data processing algorithm was performed on the data is generated. For example, if the performed data processing algorithm is the low-pass filtering algorithm for noise elimination and the configuration of the data processing history information illustrated in FIG. 4A is used, the value of the first bit of a detail item for noise elimination, i.e., a detail item having the values of the second through fifth bits as "0101," is set to "1." Also, information indicating that the low-pass filtering algorithm was performed or information indicating that the low-pass filtering algorithm was performed at a filtering level of, for example, 0.8, is further recorded in the sixth through sixteenth bits.

In operation 580, the data processing history information generated in operation 560 is transmitted to a next data processing apparatus, that is, the second data processing apparatus 220, together with the processed data. In the present exemplary embodiment, processed input data is transmitted to a next data processing apparatus together with data processing history information. However, the data processing history information may also be transmitted to the next data processing apparatus through a separate channel.

Figure 6:
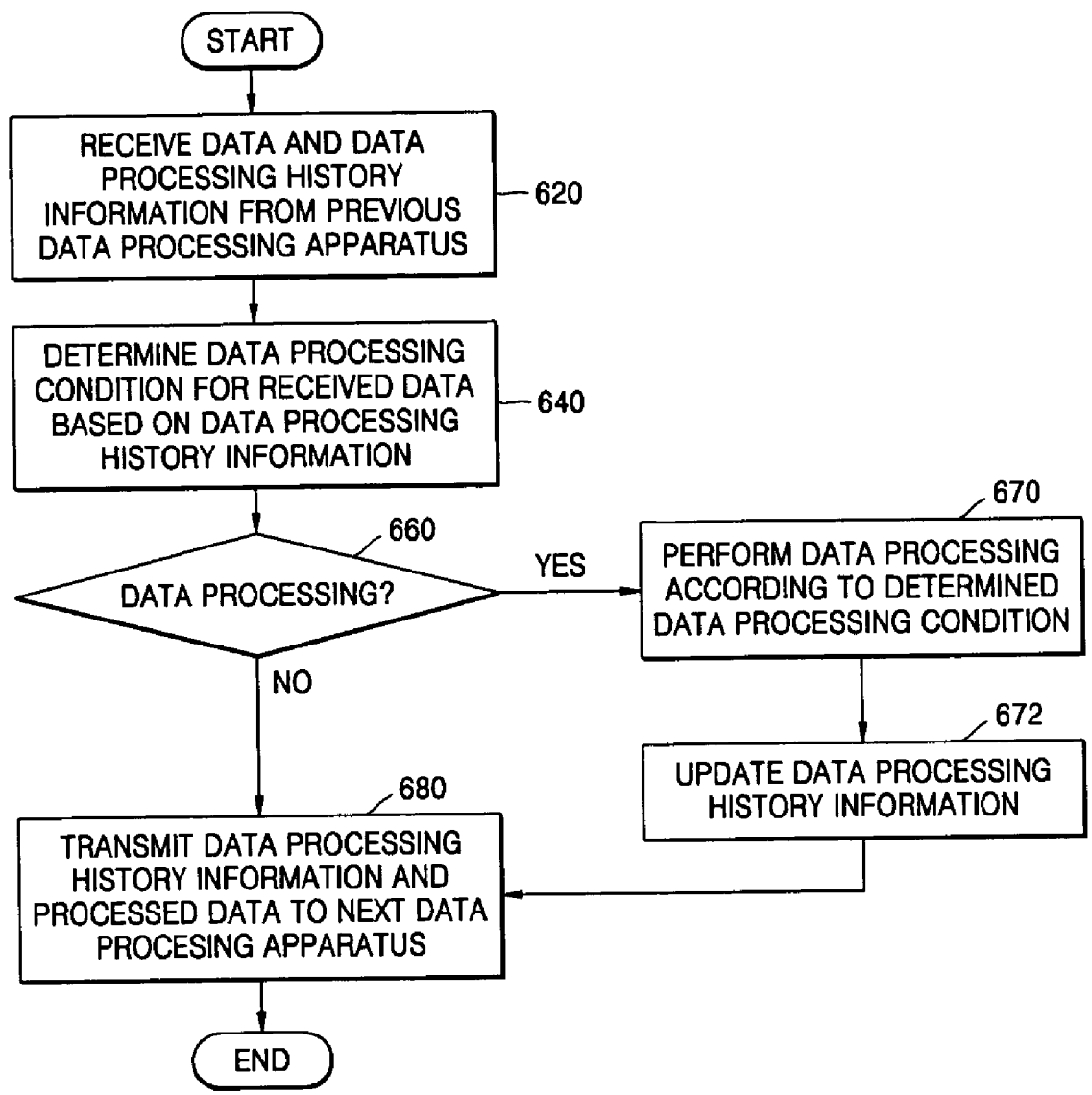
FIG. 6 is a flowchart illustrating a data processing method using a data processing apparatus according to an exemplary embodiment of the present invention.

FIG. 6 is a flowchart illustrating a data processing method using one of the first through $n^{th}$ data processing apparatuses 210, 220, ... 290, for example, the second data processing apparatus 220 of FIG. 2 according to an exemplary embodiment of the present invention. The method will now be described with reference to FIGS. 2 through 4.

In operation 620, data and data processing history information are received from a previous data processing apparatus.

In operation 640, a data processing condition for the received data is determined, with reference to the data processing history information. For example, if the data processing history information indicates that all data processing algorithms that can be performed by the data processing unit 222 of the second data processing apparatus 220 were performed, it is determined that additional data processing is not required. However, if the data processing history information indicates that the algorithm for contrast enhancement that can be performed by the data processing unit 222 was not performed, it is determined that the algorithm for contrast enhancement unperformed by the previous data processing apparatus, i.e., the first data processing apparatus 210, will be performed.

In operation 660, a next operation is determined based on whether to process the data according to the data processing condition determined in operation 640. If it is determined that the data will be processed, operation 670 is performed. If it is determined that the data will not be processed, operation 680 is performed.

In operation 670, the data is processed according to the data processing condition determined in operation 640. For example, even though the data processing algorithm that can be performed by the data processing unit 222 includes the algorithm for low-pass filtering, the algorithm for low-pass filtering is not performed and other data processing algorithms, for example, the algorithm for contrast enhancement, are performed.

In operation 672, the data processing history information received in operation 620 is updated such that the history of the data processing performed in operation 670 is included in the data processing history information. For example, if the algorithm for contrast enhancement is performed by a current data processing apparatus, and the configuration of the data processing history information illustrated in FIG. 4 is used, the value of the first bit of the detail item for noise elimination, i.e., the detail item having the values of the second through fifth bits as "0000," is set to "1" and an intensity level, at which the contrast of the data was adjusted, is stored in the sixth through sixteenth bits.

In operation 680, if the data was processed, the data processing history information updated in operation 672 and the processed data are transmitted to a next data processing apparatus. However, if the data was not processed, the data received in operation 620 and the data processing history information are transmitted to the next data processing apparatus.

If the current data processing apparatus is a last data processing apparatus, i.e., the $n^{th}$ data processing apparatus 290, the updating of the data processing history information and the transmission of the data/data processing history information are not performed in operations 672 and 680. A separate operation is performed according to functions of the last data processing apparatus.

For example, if the current data processing apparatus is the last data processing apparatus and input data is video data, the input data, whose image quality was enhanced last, is stored in a memory. Also, if the current data processing apparatus is a display device as well as the last data processing apparatus and input data is video data, the input data, whose image quality was enhanced last, is output to a display unit.

Figure 7:
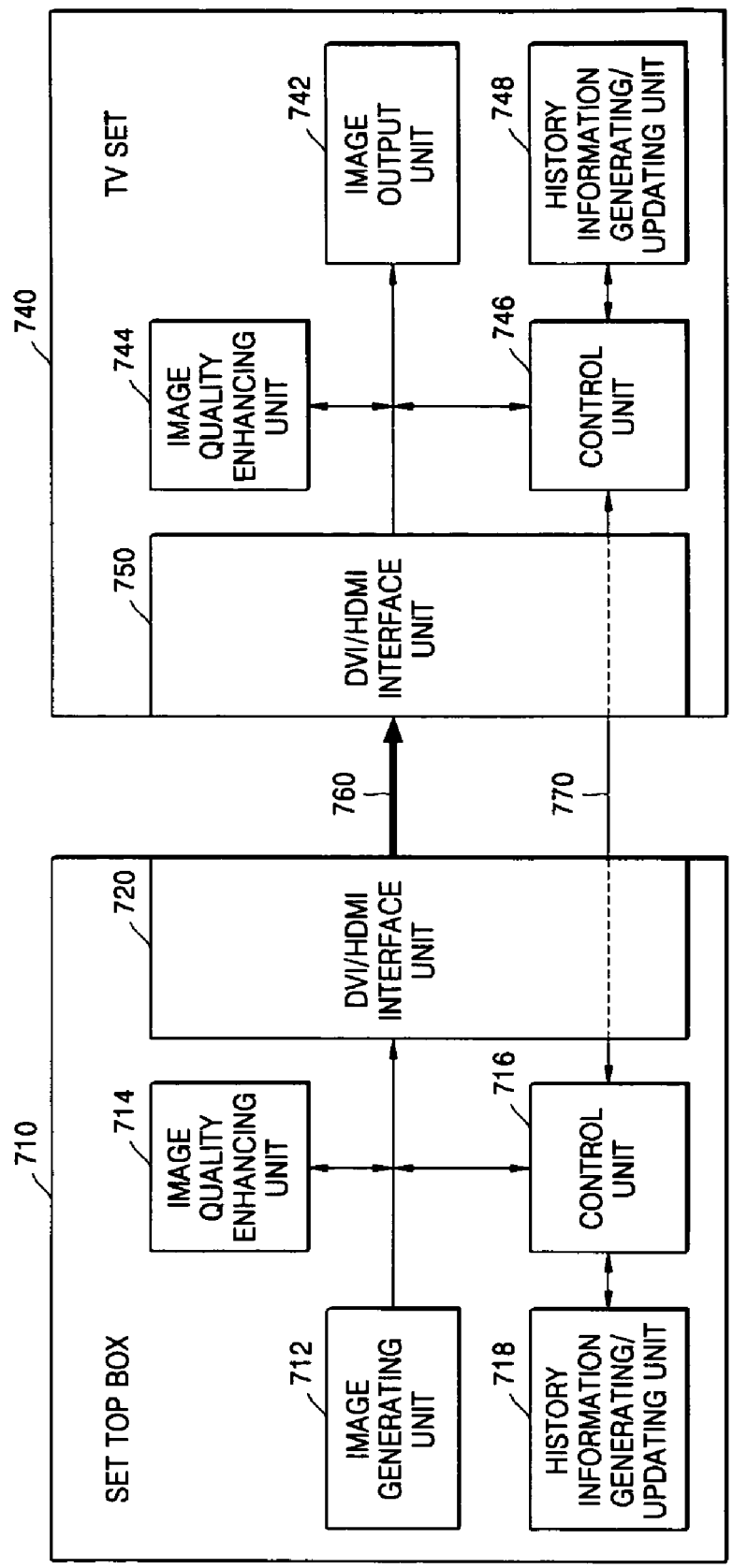
FIG. 7 is a block diagram for illustrating a data processing method according to an exemplary embodiment of the present invention.

FIG. 7 is a block diagram for illustrating a data processing method according to an exemplary embodiment of the present invention. In FIG. 7, an input signal is video data and data processing apparatuses are a set top box 710 and a TV set 740 including image quality enhancing units 714 and 744, respectively.

A method of enhancing image quality using the set top box 710 and the TV set 740, which respectively include the image quality enhancing units 714 and 744 for image quality enhancement, will now be described with reference to FIG. 7.

Referring to FIG. 7, the set top box 710 includes an image generating unit 712, the image quality enhancing unit 714, a control unit 716, a history information generating/updating unit 718, and an interface unit 720. In addition, the TV set 740 includes an image output unit 742, the image quality enhancing unit 744, a control unit 746, a history information generating/updating unit 748, and an interface unit 750. In the present exemplary embodiment, the interface units 720 and 750 use a digital video interface (DVI)/high definition multimedia interface (HDMI) 760.

In an exemplary embodiment of the present invention, controlled by the control unit 716, the image quality enhancing unit 714 processes image data generated by the image generating unit 710 of the settop box 710. For example, the image quality enhancing unit 714 performs a predetermined data processing algorithm, for example, the algorithm for low-pass filtering, on the image data.

The history information generating/updating unit 718 generates data processing history information indicating that the image data was low-pass filtered. For example, if the configuration of the data processing history information illustrated in FIG. 4A is used, the value of the first bit of the detail item for noise elimination, i.e., the detail item having the values of the second through fifth bits as "0101," is set to "1." Also, information indicating that the low-pass filtering algorithm was performed at a filtering level of, for example, 0.8, is recorded in the sixth through sixteenth bits.

The control unit 716 transmits the image data received from the image quality enhancing unit 714 and the data processing history information received from the history information generating/updating unit 718 to the TV set 740 via the interface unit 720.

In the present exemplary embodiment, the image data with enhanced image quality is transmitted to a next data processing apparatus, i.e., the TV set 740, together with the data processing history information. However, the data processing history information may also by transmitted to the next data processing apparatus through a separate channel, for example, a bi-directional interface 770.

The interface unit 750 of the TV set 740 receives the transmitted image data and data processing history information.

The control unit 746 determines a data processing condition for the received image data with reference to the received data processing history information. For example, if the data processing history information indicates that all data processing algorithms that can be performed by the image quality enhancing unit 744 were performed, the control unit 746 determines that additional data processing is not required and transmits the image data to the image output unit 742. However, if the data processing history information indicates that the algorithm for contrast enhancement that can be performed by the image quality enhancing unit 744 was not performed, the control unit 746 controls the image quality enhancing unit 744 to enhance the contrast of the image data and outputs the image data with enhanced image quality to the image output unit 742.

When the image data is transmitted to a next data processing apparatus, for example, a DVDP (not shown), the control unit 746 controls the history information generating/updating unit 748 to update the received data processing history information. For example, if the contrast of the image data was enhanced by a current data processing apparatus and the configuration of the data processing history information illustrated in FIG. 4A is used, the value of the first bit of the detail item for noise elimination, i.e., the detail item having the values of the second through fifth bits as "0000," is set to "1." Also, an intensity level, at which the contrast of the image data was adjusted, is recorded in the sixth through sixteenth bits.

When the image quality of the image data was enhanced, the control unit 746 transmits the image data with enhanced image quality to the DVDP, together with the data processing history information updated by the history information generating/updating unit 748.

In the present exemplary embodiment, the image enhancing units 714 and 744 of the settop box 710 and the TV set 740 were considered. However, the identical data processing method may also be applied to an audio processing unit.

The TV set 710 of FIG. 7, such as a digital TV, performs diverse image quality enhancement functions. However, image quality enhancement is not a primary goal of an apparatus, such as a DVDP and a set top box, which is connected to a TV set and inputs images to the TV set. Therefore, such an apparatus does not have a function for image quality enhancement or includes a low-performance image quality enhancing unit.

However, as technology develops and customer needs become sophisticated, a high-performance image quality enhancing unit has been added to an image input apparatus such as a DVDP. For example, image quality enhancing units of the same performance may be installed in TV sets and DVDPs or set top boxes that input images to the TV sets.

In this case, the process of enhancing image quality is redundantly performed, thereby distorting image quality as described above. However, the present invention can prevent redundant image quality enhancement processes. In addition, optimum image quality enhancement can be realized by adaptive image quality enhancement processes among a number of image devices.

As described above, according to the present invention, data processing by a current data processing apparatus is adaptively controlled using information regarding data processing by a previous data processing apparatus to optimally process input data. In addition, even when image devices performing a series of data processing include at least image quality enhancing units and/or audio processing units, the present invention can prevent redundant image quality enhancement processes. Also, optimum image quality enhancement can be realized by combining image quality enhancement processes among a number of image devices.

The present invention can also be implemented as computer-readable program on a computer-readable recording medium. Codes and code segments constituting the computer-readable program can be easily construed by programmers skilled in the art to which the present invention pertains. Also, the computer-readable program is stored in a computer-readable recording medium, and read and executed by a computer system to accomplish the present invention. Examples of the computer-readable recording medium include magnetic tapes, optical data storage devices, and carrier waves.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data processing method using a plurality of data processing apparatuses, the method comprising:
    receiving data from one of the data processing apparatuses;
    receiving data processing history information regarding processing of the data by the data processing apparatus; and
    processing the data based on the data processing history information,
    wherein the data processing history information comprises information regarding a level of filtering which was previously processed for the received data, and
    wherein in the processing the data, a level of filtering for the received data is determined based on the data processing history information and the received data is filtered according to the determined level of filtering.

2. The method of claim 1, wherein the data is image data, and the data processing apparatus is an image quality enhancing unit which enhances image quality of the image data.

3. The method of claim 1, wherein the data is audio data, and the data processing apparatus is an audio processing unit which enhances audio quality of the audio data.

4. The method of claim 1, further comprising updating the data processing history information such that information regarding data processing by a current data processing apparatus is included in the data processing history information.

5. The method of claim 1, wherein the data processing history information is received from the data processing apparatus via a uni-directional interface.

6. The method of claim 1, wherein the data processing history information is included in the data.

7. The method of claim 1, wherein the data processing history information is received separately from the data as additional information.

8. The method of claim 1, wherein the data processing history information comprises information regarding at least one of contrast enhancement, detail enhancement, brightness enhancement, color enhancement, noise elimination, scale conversion, and format conversion.

9. The method of claim 1, wherein the data processing history algorithm comprises at least one of information regarding an algorithm used for data processing, and information regarding parameters set in the algorithm.

10. The method of claim 1, wherein in the processing of the data, a predetermined data processing operation is bypassed based on the data processing history information, or the predetermined data processing operation is adaptively performed based on the data processing history information.

11. An apparatus for processing input data in association with a plurality of data processing apparatuses, the apparatus comprising:
    an input unit which receives data from one of the data processing apparatuses, and receives data processing history information regarding processing of the data by the data processing apparatus; and
    a data processing unit which processes the data based on the data processing history information,
    wherein the data processing history information comprises information regarding a level of filtering which was previously processed for the received data, and
    wherein a level of filtering for the received data is determined based on the data processing history information and the received data is filtered according to the determined level of filtering when the data processing unit processes the received data.

12. The apparatus of claim 11, wherein the data is image data, and the data processing unit is an image quality enhancing unit which enhances image quality of the image data.

13. The apparatus of claim 11, wherein the data is audio data, and the data processing apparatus is an audio processing unit which enhances audio quality of the audio data.

14. The apparatus of claim 11, further comprising a data processing history updating unit which updates the data processing history information such that information regarding data processing by a current data processing apparatus is included in the data processing history information.

15. The apparatus of claim 11, wherein the data processing history information comprises information regarding at least one of contrast enhancement, detail enhancement, brightness enhancement, color enhancement, noise elimination, scale conversion, and format conversion.

16. The apparatus of claim 11, wherein the data processing history algorithm comprises at least one of information regarding an algorithm used for data processing, and information regarding parameters set in the algorithm.

17. The apparatus of claim 11, wherein the data processing unit bypasses a predetermined data processing operation based on the data processing history information or adaptively performs the predetermined data processing operation based on the data processing history information.

18. A data processing method using a plurality of data processing apparatuses, the method comprising:

performing a predetermined data processing operation on input data;

generating data processing history information regarding processing of the input data; and transmitting the processed input data and the data processing history information to one of the data processing apparatuses, wherein the data processing history information comprises information regarding a level of filtering which was previously processed for the input data, and wherein in processing the data in the one of the data processing apparatuses, a level of filtering for the input data is determined based on the data processing history information and the input data is filtered according to the determined level of filtering.

19. The method of claim 18, wherein the input data is image data, and the data processing apparatus is an image quality enhancing unit which enhances image quality of the image data.

20. The method of claim 18, wherein the input data is audio data, and the data processing apparatus is an audio processing unit which enhances audio quality of the audio data.

21. The method of claim 18, wherein the data processing history information is received from the data processing apparatus via a uni-directional interface.

22. The method of claim 18, wherein the data processing history information is included in the input data.

23. The method of claim 18, wherein the data processing history information is received separately from the input data as additional information.

24. The method of claim 18, wherein the data processing history information comprises information regarding at least one of contrast enhancement, detail enhancement, brightness enhancement, color enhancement, noise elimination, scale conversion, and format conversion.

25. The method of claim 18, wherein the data processing history algorithm comprises at least one of information regarding an algorithm used for data processing, and information regarding parameters set in the algorithm.

26. The method of claim 18, wherein in the performing of the predetermined data processing operation, the predetermined data processing operation is bypassed based on the data processing history information, or the predetermined data processing operation is adaptively performed based on the data processing history information.

27. An apparatus for processing input data in association with a plurality of data processing apparatuses, the apparatus comprising:

a data processing unit which performs a predetermined data processing operation on input data;

a data processing history information generating unit which generates data processing history information regarding processing of the input data; and a transmitting unit which transmits the processed input data and the generated data processing history information to one of the data processing apparatuses, wherein the data processing history information comprises information regarding a level of filtering which was previously processed for the input data, and wherein in processing the data in the one of the data processing apparatuses, a level of filtering for the input data is determined based on the data processing history information and the input data filtered according to the determined level of filtering.

28. The apparatus of claim 27, wherein the input data is image data, and the data processing unit is an image quality enhancing unit which enhances image quality of the image data.

29. The apparatus of claim 27, wherein the input data is audio data, and the data processing unit is an audio processing unit which enhances audio quality of the audio data.

30. The apparatus of claim 27, wherein the data processing history information comprises information regarding at least one of: contrast enhancement, detail enhancement, brightness enhancement, color enhancement, noise elimination, scale conversion, and format conversion.

31. The apparatus of claim 27, wherein the data processing history algorithm comprises at least one of information regarding an algorithm used for data processing, and information regarding parameters set in the algorithm.

32. The apparatus of claim 27, wherein the data processing unit bypasses the predetermined data processing operation based on the data processing history information, or adaptively performs the predetermined data processing operation based on the data processing history information.

33. A computer-readable recording medium which stores a program for executing a data processing method using a plurality of data processing apparatuses, the method comprising:

receiving data from one of the data processing apparatuses;

receiving data processing history information regarding processing of the data by the data processing apparatus; and processing the data based on the data processing history information, wherein the data processing history information comprises information regarding a level of filtering which was previously processed for the received data, and wherein in the processing the data, a level of filtering for the received data is deteremined based on the data processing history information and the received data is filtered according to the determined level of filtering.

34. The medium of claim 33, wherein the data is image data, and the data processing apparatus is an image quality enhancing unit which enhances image quality of the image data.

35. The medium of claim 33, wherein the data is audio data, and the data processing apparatus is an audio processing unit which enhances audio quality of the audio data.

36. The medium of claim 33, further comprising updating the data processing history information such that information regarding data processing by a current data processing apparatus is included in the data processing history information.

37. The medium of claim 33, wherein the data processing history information comprises information regarding at least one of contrast enhancement, detail enhancement, brightness enhancement, color enhancement, noise elimination, scale conversion, and format conversion.

38. The medium of claim 33, wherein the data processing history algorithm comprises at least one of information regarding an algorithm used for data processing, and information regarding parameters set in the algorithm.

39. The medium of claim 33, wherein in the processing of the data, a predetermined data processing operation is bypassed based on the data processing history information, or the predetermined data processing operation is adaptively performed based on the data processing history information.

40. A computer-readable recording medium storing a program for executing a data processing method using a plurality of data processing apparatuses, the method comprising:

performing a predetermined data processing operation on input data;

generating data processing history information regarding processing of the input data; and transmitting the processed input data and the generated data processing history information to one of the data processing apparatuses, wherein the data processing history information comprises information regarding a level of filtering which was previously processed for the input data, and wherein in processing the data in the one of the data processing apparatuses, a level of filtering for the input data is determined based on the data processing history information and the input data is filtering according to the determined level of filtering.

41. The medium of claim 40, wherein the input data is image data, and the data processing apparatus is an image quality enhancing unit which enhances image quality of the image data.

42. The medium of claim 40, wherein the input data is audio data, and the data processing apparatus is an audio processing unit which enhances audio quality of the audio data.

43. The medium of claim 40, wherein the data processing history information comprises information regarding at least one of: contrast enhancement, detail enhancement, brightness enhancement, color enhancement, noise elimination, scale conversion, and format conversion.

44. The medium of claim 40, wherein the data processing history algorithm comprises at least one of: information regarding an algorithm used for data processing and information regarding parameters set in the algorithm.

45. The medium of claim 40, wherein in the performing of the predetermined data processing operation, the predetermined data processing operation is bypassed based on the data processing history information, or the predetermined data processing operation is adaptively performed based on the data processing history information.

* * * * *